(No Model.)

I. H. TRABUE.
COUPLING LINK.

No. 270,860.    Patented Jan. 16, 1883.

Witnesses:
A. M. Long.
Jas. Lange.

Isaac H. Trabue,
Inventor.
per Hallock & Hallock
Attys.

UNITED STATES PATENT OFFICE.

ISAAC H. TRABUE, OF LOUISVILLE, KENTUCKY.

COUPLING-LINK.

SPECIFICATION forming part of Letters Patent No. 270,860, dated January 16, 1883.

Application filed September 6, 1882. (No model.)

To all whom it may concern:

Be it known that I, ISAAC H. TRABUE, a citizen of the United States of America, residing at Louisville, in the county of Jefferson and State of Kentucky, have invented certain new and useful Improvements in Coupling Chains and Links and Adjustable Links; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
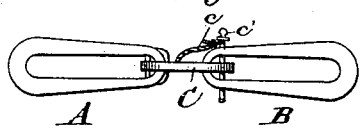
Figure 2:
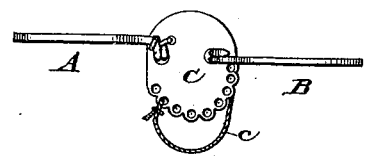
Figure 5:
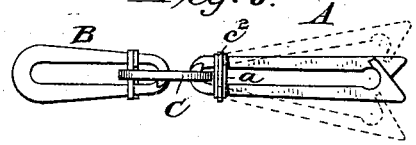
Figure 6:
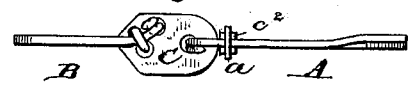
Figure 3:
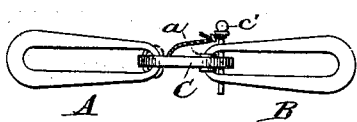
Figure 4:
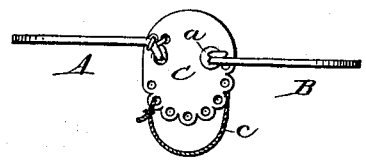
Figure 7:
Figure 8:
Figure 9:
Figure 10:

Figures 1 and 2 represent respectively a top plan view and a side elevation of one form of my device. Figs. 3 and 4 are similar views, with the addition of a rubber packing in the joint between the movable link and plate. Figs. 5 and 6 represent respectively a top plan view and a side elevation of the links, having movable jaws held together by a flexible device which encircles the said jaws. Figs. 7 and 8, respectively, represent a top plan view and a side elevation of reversible links having an elastic band passing around the bodies, as shown; and Figs. 9 and 10 are similar views, the rubber supporter, however, being upon the pintle of the movable joint.

The object of my invention is to produce a link which will fit cars of different heights; and it consists of a combination of parts, all as will hereinafter be described and claimed.

A and B represent links joined together in such a manner that one may be elevated at any desired angle. In Figs. 1, 2, 3, and 4 these links are shown joined together by means of a plate, C. In Figs. 1 and 2 the link A is preferably rigidly attached to plate C, and link B moves loosely in its slot upon the opposite side. The plate C is perforated near the border with a number of holes, $c$, in which a pin, $c'$, for supporting the link B in any desired position or elevation, is inserted. In Figs. 3 and 4 a rubber packing, $a$, is placed in the slot for link B, and serves to hold the link in any desired position. This rubber may be used alone or conjointly with the pin $c$, as both are for the same purpose. In Figs. 5 and 6 jaws pivoted in the plate are substituted for the link A in Figs. 1, 2, 3, and 4. A plate, $c^2$, having recesses $c^3$ for the jaws to move in, is placed between the jaws as a stop for their movement toward each other. An elastic band encircles both jaws and tends to draw them toward each other and holds them against the plate at any desired angle. In coupling the cars the pin strikes between the beveled ends of and forces itself between the jaws. The flexible band draws the ends together as soon as the pin has passed. In Figs. 7 and 8 the links are made of bars of iron bent to a U shape, and having their ends twisted into eyes, which interlace and serve as a substitute for plate C. A flexible band is passed around the angle and through the eyes of link and over the link B, and serves to hold the links at any desired angle. In Figs. 9 and 10 the links A and B have substantially the same shape, but are joined together by a pintle which passes through the eyes. The flexible band $a$ is placed upon the pintle in such a manner as to separate the eyes of the links and hold the latter at any desired angle.

I am aware that links have been made in two sections and joined together by different means; but am not aware that the links have been provided with means for supporting them at any desired angle.

I do not wish to limit myself in this application to any of the forms not specifically claimed, as I intend making such forms the subject of separate applications.

What I claim in this application, and desire to secure by Letters Patent of the United States, is—

1. The combination of a coupling-link having jointed sections, and means, substantially as described, for holding one of the links at any desired angle.

2. The combination of a coupling-link having jointed sections formed of bar iron bent to a U shape and joined together at their ends, and an elastic band, substantially as described, for supporting the sections at any desired angle.

In testimony whereof I affix my signature in presence of two witnesses.

ISAAC H. TRABUE.

Attest:
THOS. N. EASTIN,
E. R. FISHER.